United States Patent [19]

Ogawa et al.

[11] 3,964,142

[45] June 22, 1976

[54] APPARATUS FOR CUTTING AND STRIPPING INSULATED WIRE

[75] Inventors: Akira Ogawa, Kawanishi; Masashi Sakao, Nishinomiya, both of Japan

[73] Assignee: Shin Meiwa Industry Co., Ltd., Nishinomiya, Japan

[22] Filed: Feb. 14, 1975

[21] Appl. No.: 550,125

[30] Foreign Application Priority Data

Feb. 20, 1974 Japan............................... 49-20766
Sept. 18, 1974 Japan............................. 49-108088

[52] U.S. Cl............................. 29/33 M; 29/203 D
[51] Int. Cl.².......................................... H01R 11/08
[58] Field of Search......... 29/33 M, 203 D, 203 DT, 29/628

[56] References Cited
UNITED STATES PATENTS

3,583,055  6/1971  Hammond...................... 29/203 DT

*Primary Examiner*—Othell M. Simpson
*Assistant Examiner*—Z. R. Bilinsky
*Attorney, Agent, or Firm*—W. G. Fasse; W. W. Roberts

[57] ABSTRACT

An apparatus for cutting an insulated electric wire into lengths and crimping a terminal to the end of the resulting wire lengths, comprising means for intermittently supplying said insulated electric wire through a predetermined distance, a cutter blade assembly operable in timed relation with the intermittent wire supply and including a cutter blade for cutting the wire and a cutter blade spaced forwardly therefrom for cutting only the insulator of the wire, wire length transfer means laterally extending and mounted pivotally at a position spaced from the assembly, which transfer means comprises a circulating conveyer having a plurality of grippers disposed at intervals and being moved intermittently in timed relation with the intermittent wire supply for conveying the wire lengths away from the supply means, and driver means for alternately driving the transfer means to a normal position and a forwardly shifted position in timed relation with the intermittent wire supply, the abovementioned timed relation being such that during interruption of the wire supply the assembly is enabled and then the transfer means is driven to the shifted position, whereby the insulator rearward of the insulator cutter is stripped, and thereafter the conveyer is moved by one interval so that the subsequent gripper grips the subsequent wire length, whereupon the next cycle is repeated.

15 Claims, 22 Drawing Figures

APPARATUS FOR CUTTING AND STRIPPING INSULATED WIRE

BACKGROUND OF THE INVENTION

1. Field of the Invention:

The present invention relates to an apparatus for cutting and stripping an insulated electric wire. More specifically, the present invention relates to such an apparatus for cutting an insulated electric wire into lengths and processing the end of the resulting wire lengths.

2. Description of the Prior Art;

Heretofore, an insulated wire cutting and stripping machine (generally referred to as a wire stripper) has been known as disclosed in U.S. Pat. Nos. 2,497,112 and 2,571,078, comprising a pair of core wire cutting blades, two opposed pairs of insulator cutting and stripping blades on both sides of said first-mentioned pair, clamp means adapted to be reciprocated centrally of the group of said three pairs of cutter blades in a direction parallel to said group, wherein withdrawal of a wire from a wire supply reel is effected by said clamp means and stripping of the insulator from both ends is effected by the alternate pulling actions in the forward and rearward directions in the cut condition. The wire length thus having the insulator stripped from both ends thereof is then subjected to soldering operation or other terminal-attaching operation in the next step depending upon the object for which it is used.

In recent years, there has been an increasing tendency toward automation for saving labor or for mass production. One would attempt to incorporate or operatively connect the next-step working machine, e.g., a terminal-crimping machine to the wire stripper of the type described above. However, the above-mentioned clamp means is designed to receive a driving motion through a number of cam mechanisms, links and the like and when a certain amount of wear is produced in the machine, there will be increased clearances, causing variations in the clamp stop position in the subsequent insulator stripping step. Consequently, the distance between the wire length gripper being transferred to the terminal-crimping means and the front end of the cut wire length will also vary, and even if wire lengths with their front end positions thus varying are transferred to the terminal-crimping means, it would be impossible to achieve a satisfactory terminal-crimping operation. Thus, this problem remains to be solved.

In order to eliminate said disadvantage, an invention has been made as disclosed in Japanese Patent Opening No. 975/72. In said invention, when wire length clamps provided on a transfer conveyor are transferred to terminal-crimping means, they are guided by a grooved cam, so that the distance from said wire length clamps to the terminal-crimping means is constant, but it is not so designed that the distance from the wire length clamps to the front ends of the wire lengths, which is the utmost importance, is constant. As a result, the last-mentioned distance does vary and said disadvantage cannot be completely eliminated. That is, the construction of the wire length clamp is such that it is capable of freely moving on two pins spanning two chains. In a region close to the terminal-crimping means, the position control is effected by the two cams as described above, but since the distance between the two camming surfaces, when the wire is clamped in the wire stripper section, is increased to such an extent as to allow movement of the wire length clamp, it is impossible to effect position control, with the result that there is the danger of the clamp being deviated due to vibration or other cause immediately before clamping takes place.

SUMMARY OF THE INVENTION

The present invention is directed to terminal-crimping on only one of the respective ends of a plurality of wire lengths and relates to a continuous terminal-crimping machine for a plurality of wires, wherein a wire length which has been cut and whose front end alone has been stripped of its insulator by a known wire stripper is subjected to insulator stripping of the rear end thereof by the swing movement of wire length transfer means having a plurality of grippers each adapted to grip a wire length with a constant distance with respect to cutter blades and wherein when wire lengths are transferred to a plurality of terminal-crimping means respectively disposed in front of the stop positions of the grippers laterally of said transfer means, the wire lengths are passed through wire length guide means whereby one wire length alone is guided toward the predetermined position whereas the others are arrested and turned back, the distance between the terminal and the wire length being made constant.

DESCRIPTION OF THE PREFERRED EMBODIMENTS:

Referring to the drawings, 1 designates a wire stripper of substantially conventional construction; 2 designates a pair of wire supply reels; 3 designates a cutter assembly consisting of a pair of core wire cutter blades and two opposed pairs of insulator cutter blades disposed on both sides of the first-mentioned pair; 4 designates clamp means adapted to be reciprocated across said cutter assembly 3 in a direction parallel to the latter for withdrawing wires 5 from the wire supply reels 2 and stripping only the right-hand side end insulator portions of cut wire lengths, said clamp means 4 being operatively connected to said cutter assembly 3 by a suitable connecting mechanism provided in the machine body. Wire length transfer means 6 disposed on the wire withdrawing side of the cutter assembly 3 and extending at right angles with the cutter assembly comprises a suitable number of equally spaced wire length grippers 7 adapted to be driven for intermittent circulating movement through a distance of one pitch each time it is actuated in timed relation to the actuation of the wire stripper 1. The wire length transfer means 6 is arranged so that it can be turned around the axis of a shaft 11 pivotally supported in bearings 9 and 10 on a base 8 on the side opposite to the wire withdrawing side by the retracting action of a cylinder 12 which interconnects said base 8 and wire length transfer means 6.

Figure 1:
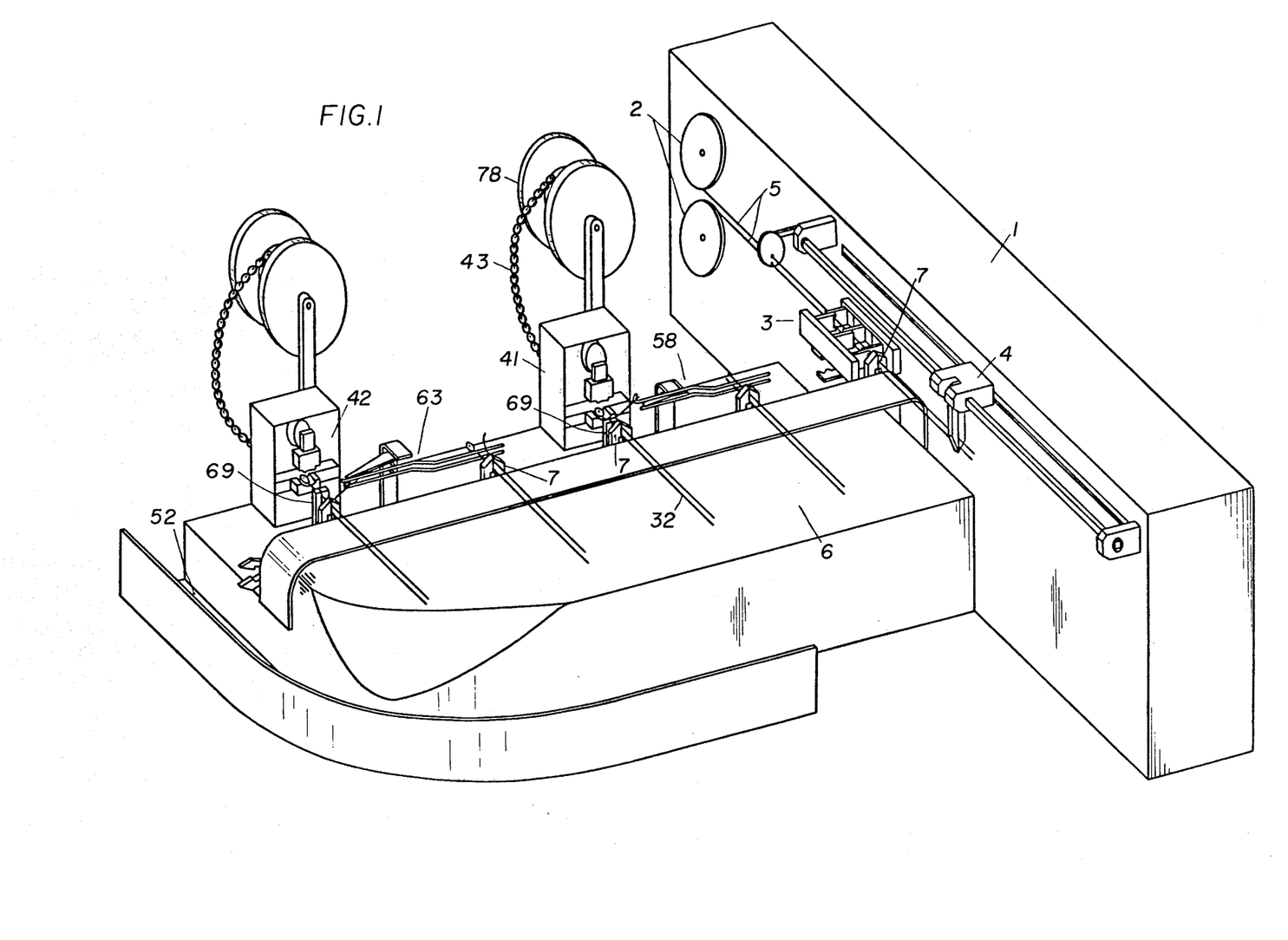
FIG. 1 is a complete perspective view.
Figure 2:
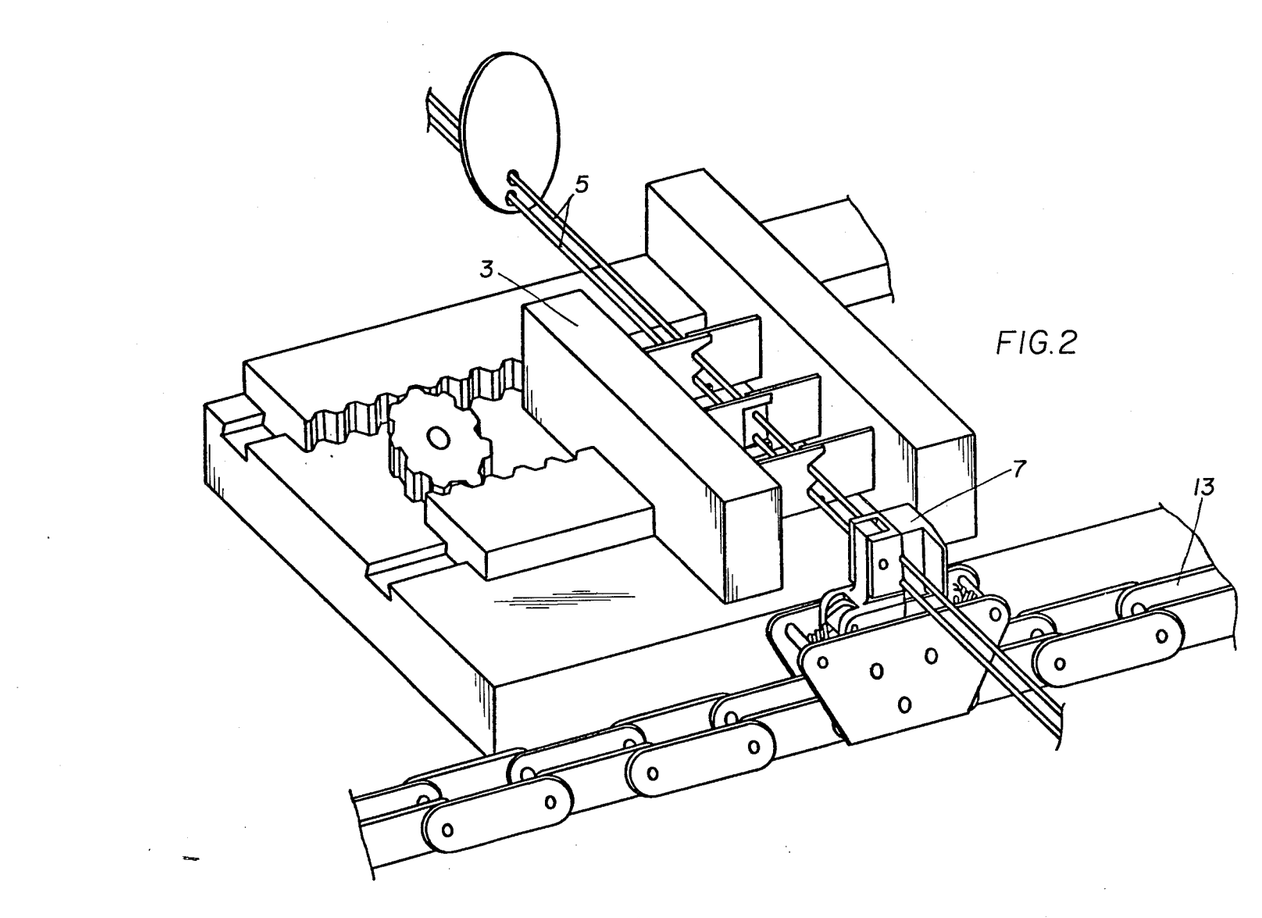
FIG. 2 is a perspective view showing a cutter assembly opening and closing mechanism, a wire length gripper and part of an endless chain.
Figure 3:
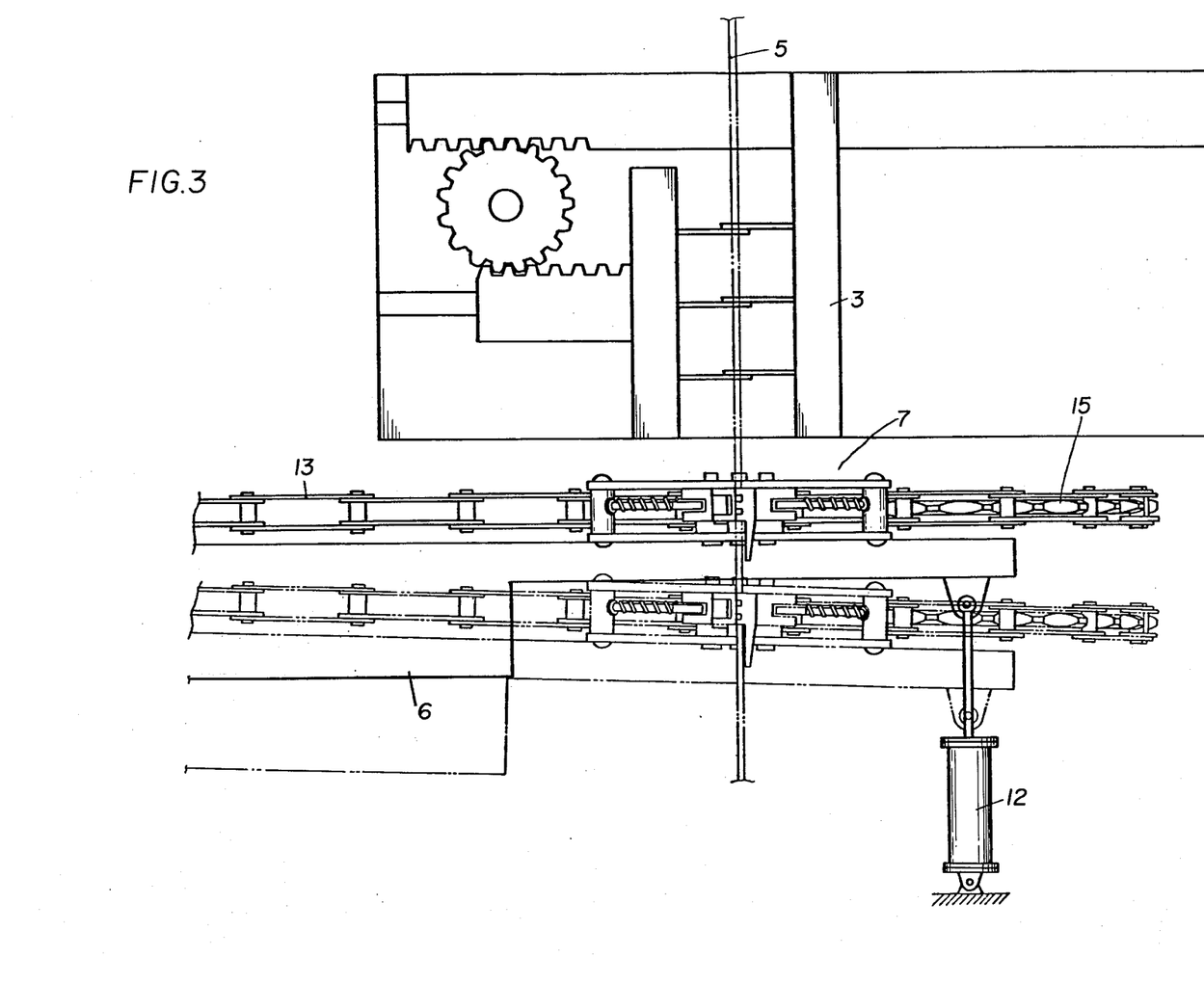
FIG. 3 is a plan view showing how insulator stripping operation on the rear end of a cut wire length is carried out by wire length transfer means.
Figure 4:
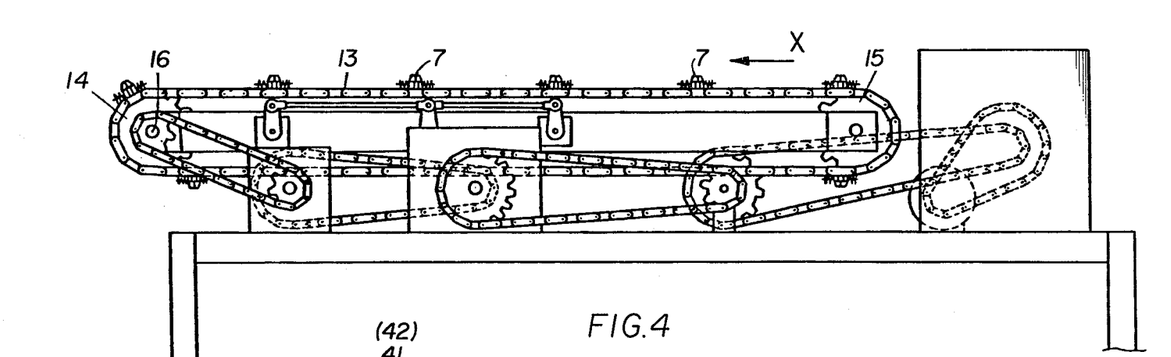
FIG. 4 is a front view on a reduced scale showing how the wire length grippers on the wire length transfer means are driven for circulation.
Figure 5:
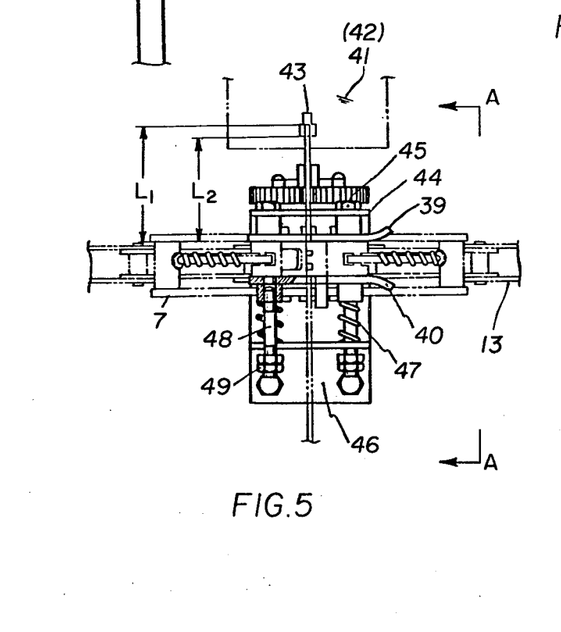
FIG. 5 is a plan view of wire length gripper guide means in front of terminal-crimping means.
Figure 6:
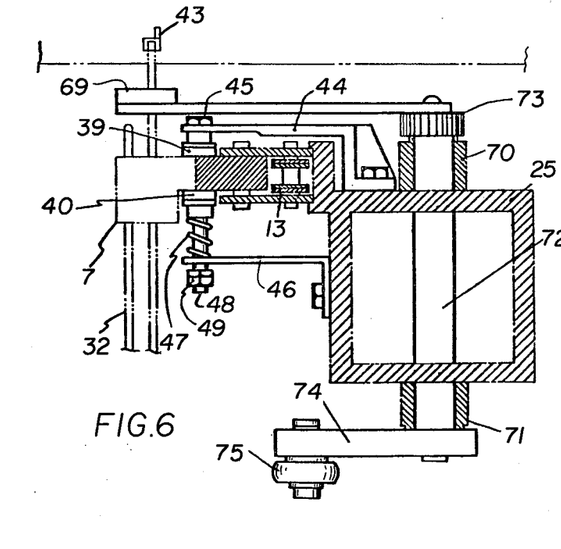
FIG. 6 is a view taken in the direction of arrow A—A in FIG. 5.
Figure 7:
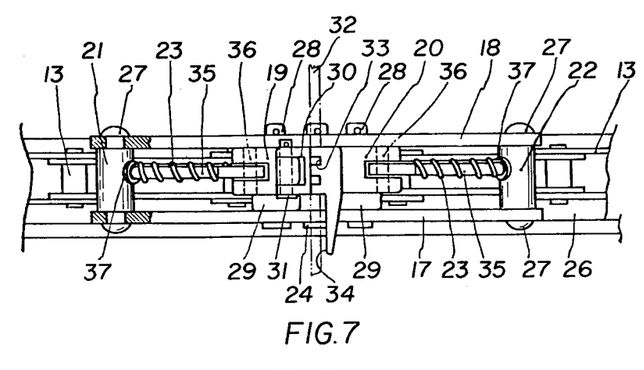
FIG. 7 is an enlarged plan view of a wire length gripper.

In addition, the operative connection with the wire stripper 1 may be by known means through a suitable cam, link, chain or the like instead of the cylinder 12. An endless chain 13 is entrained around sprocket wheels 14 and 15 disposed on both sides of the wire length transfer means 6. When intermittent rotary movement is transmitted to the shaft 16 of the sprocket wheel 14 through a chain-driven speed reduction mechanism and a one-rotation clutch in timed relation to the wire stripper 1, the upper run of the endless chain 13 is moved in the direction of arrow $x$ shown in FIG. 4 through a distance of 1 pitch of the wire length grippers 7.

Each wire length gripper 7 comprises support plates 17, 18, front and rear jaws 19, 20, stepped pins 21, 22, compression springs 23 and a connecting pin 24, the grippers 7 being attached to said endless chain at equal intervals. Thus, the support plates 17 and 18 are pivotally connected to one of the links of the endless chain 13 by the connecting pin 24 so as to hold the link therebetween the arrangement being such that while the support plates are being guided at their bottoms by a guide plate 26 horizontally extending from the frame 25 of the transfer means, they are moved along the upper horizontal portion. Further, the support plates 17 and 18 are interconnected at their front and rear regions by the stepped pins 21, 22 and set screws 27, and at their upper central region the front and rear jaws 19 and 20, which are equipped with gear wheels meshing with each other, are pivotally connected thereto by pins 28 and washers 29.

Figure 8:
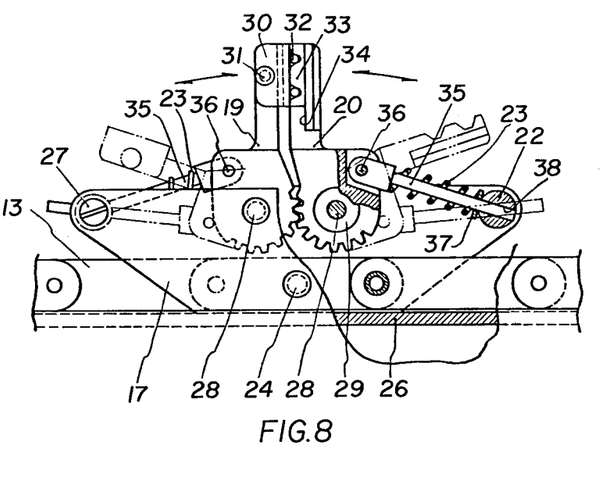
FIG. 8 is an enlarged front view of said wire length gripper.
Figure 9:
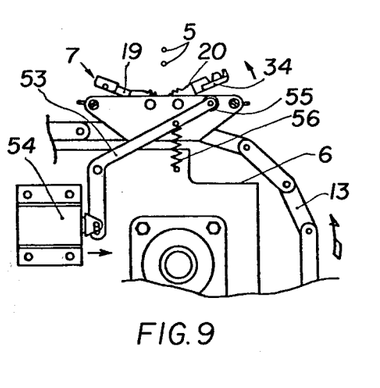
FIGS. 9 and 10 are enlarged plan views showing the conditions before and after wire length gripping at the initial end of the wire length transfer means.
Figure 10:
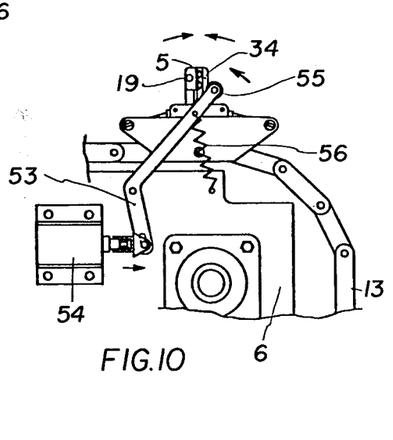
Figure 11:
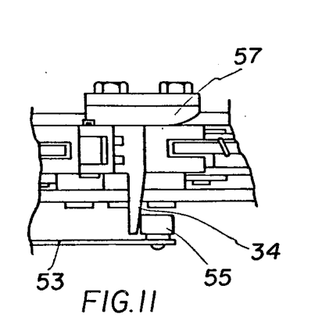
FIG. 11 is an enlarged plan view of the principal portions of FIG. 10.

The jaw 19 has a channel-shaped flat jaw portion 30 pivotally connected to the upper region thereof by a pin 31, while the rear jaw 20 is formed with a sawtoothed jaw portion 33 to cooperate with said flat jaw portion 30 to hold cut wire lengths 32, 32 therebetween, said sawtoothed jaw portion laterally extending to provide a push portion 34 having an inclined back. Each of the front and rear jaws 19 and 20 has a slot cut in its shoulder portion, in which a shouldered pin 35 is pivotally mounted by a pin 36, and a compression spring 23 and a seat plate 37 are interposed between the shoulder of said pin 35 and each of the stepped pins 21 and 22, the front end of the shouldered pin 35 being inserted in a guide hole 38 formed in the stepped pin 21, 22, the arrangement being such that said compression springs 23 normally urge the front and rear jaws 19 and 20 toward each other to enable them to grip wire lengths and that when the push portion 34 is outwardly pushed, the front and rear jaws 19 and 20 are outwardly opened turning around the axes of the pins 28 until each of the pins 36 is turned across a line which connects the stepped pin 21 or 22 and the pin 28, as shown in phantom lines in FIG. 8, where the jaws are maintained in their open position.

Fixed and movable guides 39 and 40, respectively, are suitably spaced from each other and positioned in front of each of the first and second terminal-crimping means 41 and 42 installed at stop positions of the wire length grippers 7 laterally of the wire length transfer means 6. One such fixed guide and one such movable guide form a pair, serving to maintain constant the distance L2 between the wire length gripper 7 and a crimp terminal 43 on the terminal-crimping means 41 or 42 during the terminal-crimping operation. Thus, the fixed guide 39 is fixed to a bracket 44 by bolts 45, 45, which bracket is fixed to the transfer means frame 25, while the movable guide 40 is mounted on a bracket 46 also fixed to the wire length transfer means 6 and is arranged so that it cooperates with the fixed guide 39 to elastically hold a wire length gripper 7 therebetween by means of two compression springs 47, 47 and bolts 48, 48 each having two lock nuts 49 screwed thereon.

Figure 12:
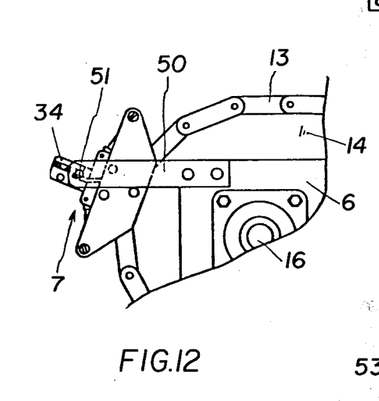
FIG. 12 is a view showing the conditions just before removal of grip action at the rear end of the wire transfer means.
Figure 13:
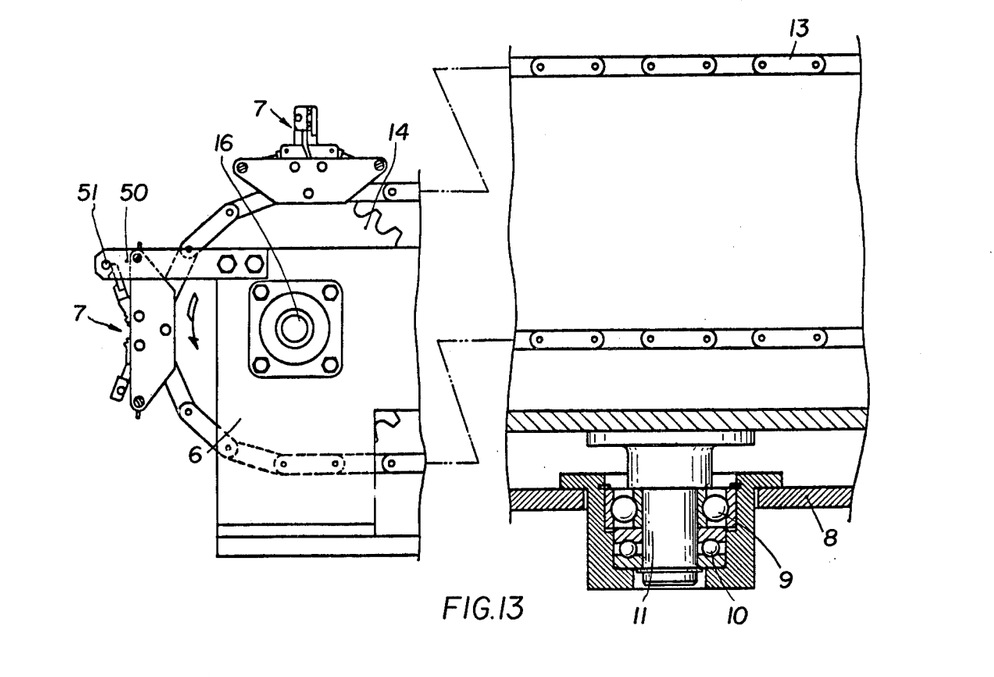
FIG. 13 is a front view showing the wire length transfer means swing center line and the removal of wire length grip action being completed.
Figure 14:
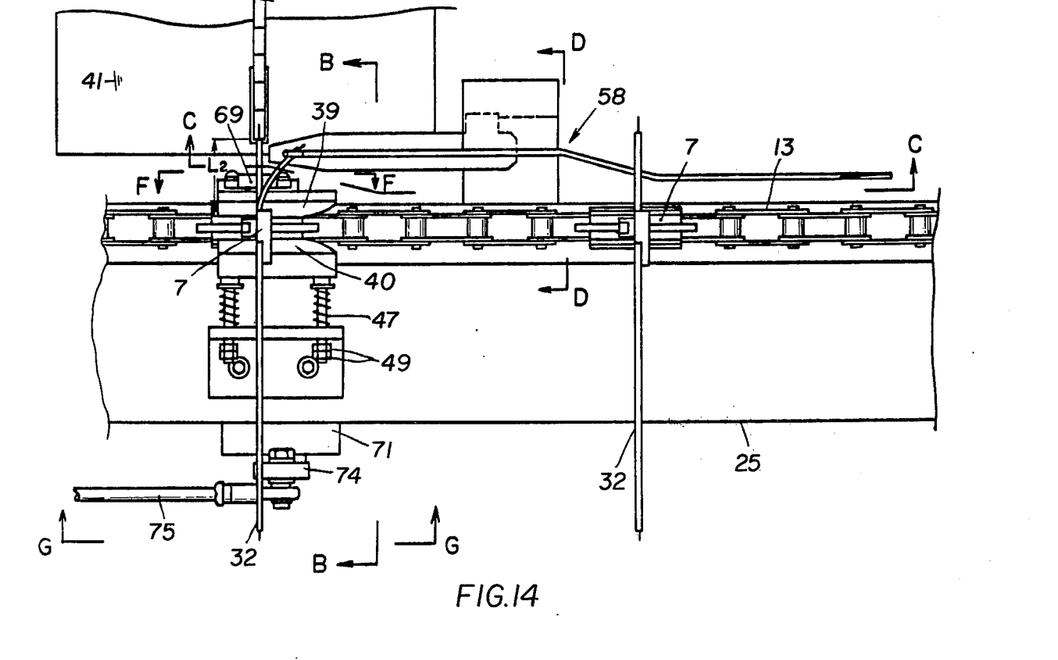
FIG. 14 is a plan view of part of the wire length transfer means adjacent to the front of the first terminal-crimping means, the view also showing the first wire length guide means and wire length holding clamp means.
Figure 15:
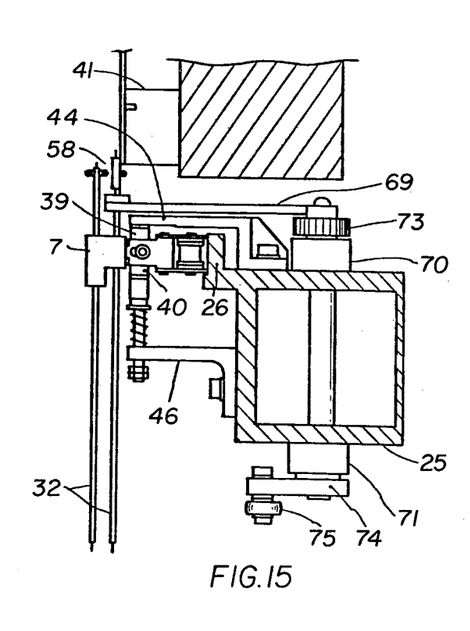
FIGS. 15, 16, 17, 20 and 21 are views taken in the directions of arrows B—B, C—C, D—D, F—F and G—G in FIG. 14, respectively.
Figure 16:
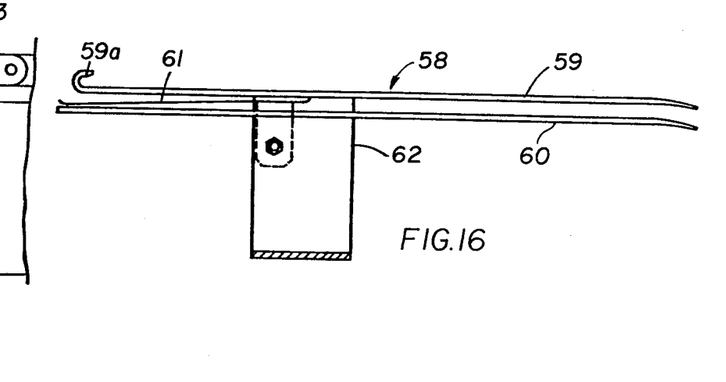
Figures 17, 18, 19, 20:
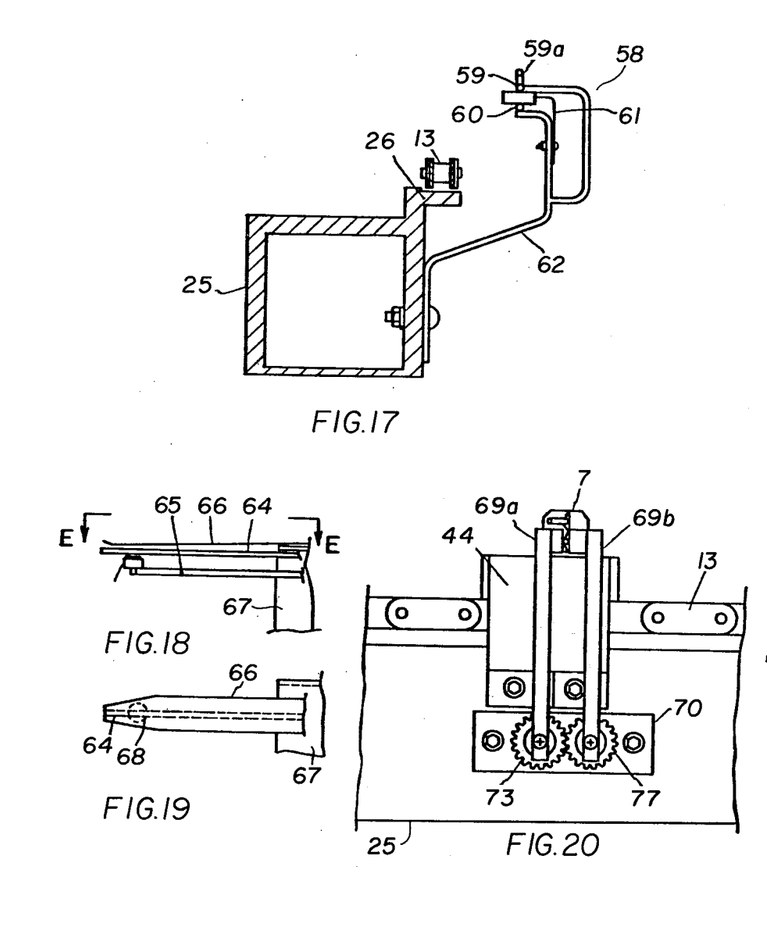
FIG. 18 is a front view of the front end portion of the second wire length guide means.
FIG. 19 is a view taken in the direction of arrow E—E in FIG. 18.
Figure 21:
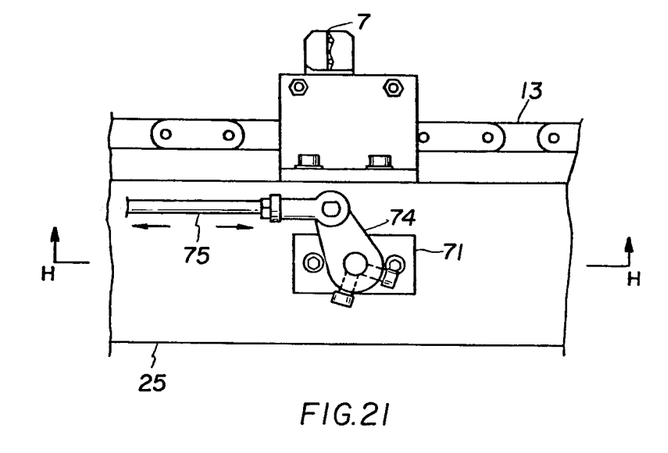
Figure 22:
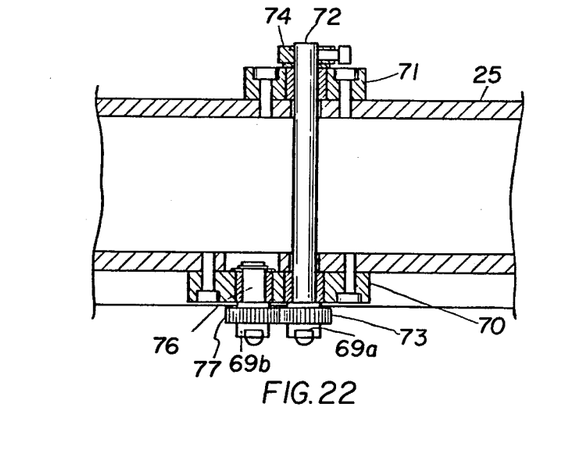
FIG. 22 is a section along the line H—H in FIG. 21.

There is provided an arm rearwardly extending from the transfer terminal end of the wire length transfer means 6, i.e., from the lateral portion of the transfer means 6 on the side of the sprocket wheel 14 and having a gripper opening pin 51 inwardly extending from the front end thereof, so that when a wire length gripper 7 with wire lengths gripped thereby passes by said arm, the gripper opening pin 51 engages the inner side of the push portion 34 of the rear jaw (in a condition shown in FIG. 12). As the endless chain 13 continues to rotate, therefore, the wire length gripper 7 is caused to open as shown at the left-hand side of FIG. 13, allowing the terminal-crimped wire lengths to fall downwardly onto a receiver pan 52.

A wire length gripper closing lever 53 is pivotally supported at the intermediate portion thereof by the wire length transfer means 6 below the wire withstanding line and connected at one end thereof to a solenoid 54 disposed on the wire length transfer means side so that the lever 53 may be swung when the solenoid 54 is energized in timed relation to the actuation of the wire stripper 1, the other end of the lever 53 carrying a roller 55 adapted to urge the back of the push portion 34 of the rear jaw 20 during stoppage of the latter to close the front and rear jaws 19 and 20 to grip withdrawn wires 5. Upon deenergization of the solenoid 54, the jaws are brought back to their original position under the force of a tension spring 56 stretched between the lever 53 and the wire length transfer means 6. In this connection, the engagement between the roller 55 and the inclined surface on the back of the push portion 34 urges the wire length gripper 7 toward a fixed guide 57 on the side of the cutter assembly 3 while the gripper is being closed.

A first wire length guide means 58 disposed along the wire length transfer means 6 on the upstream side of the first terminal-crimping means 41 comprises upper and lower guides 59 and 60 formed of a round bar and a presser spring 61 in the form of a plate, these members being supported by a bracket 62 obliquely upwardly projecting from the lateral portion of the frame 25 of the wire length transfer means. The guide means 58 is bent as a whole so that the wire length entrance side guides the portions of wire lengths close to the wire length gripper 7 and that the wire length exit side guides the front end portions. The wire length entrance side alone is more or less downwardly bent to pick up wire lengths 32. Further, the exit side of the upper guide 59 terminates somewhat short of the stop position and is upwardly U-turned (as at 59a) so that an upper wire length 32 alone may be arrested and turned back. The presser spring 61 extends obliquely from the lower surface of the upper guide 59 to the upper surface of the lower guide 60 in a region extending from intermediate between the ends of the upper and lower guides 59 and 60 to the exit so that a lower wire length 32 may be delivered along the upper surface of lower guide 60 under the force of said spring.

A second wire length guide means 63 disposed on the upstream side of the second crimping means 42 comprises upper and lower guides 64 and 65 formed of a round bar and a presser spring 66 in the form of a plate, these members being supported by a bracket 67 obliquely upwardly projecting from the lateral portion of the frame 25 of the wire length transfer means, as in the case of said first wire length guide means 58. Again, the guide means 63 is bent so that the wire length entrance side guides the wire length portions close to the wire length gripper 7 and the exit side guides the front end portions. The wire length entrance side alone is more or less downwardly bent to pick up wire lengths 32. The exit side of the lower guide 65 terminates somewhat short of the stop position of the wire lengths 32 and has a miniroller 68 horizontally attached to the front end thereof so that the lower, terminal-crimped wire length which has reached said miniroller may be once arrested and turned back and then readily pass by. The presser spring 66 is gradually downwardly sloping from intermediate between the ends of the upper guide 64 toward the exit, ensuring that the upper wire length 32 will be delivered along the upper guide 64 under the force of the spring.

A clamp 69 for holding a wire length during the terminal-crimping operation is disposed in front of each of the first and second terminal-crimping means 41 and 42 and comprises two arms 69a and 69b for clamping therebetween a wire length 32 guided by the lower guide 60 or upper guide 64. Thus, it serves for the holding and position control of said wire length 32 with respect to its path of travel. The arm 69a is fixed on one end of an operating shaft 72 extending through the transfer means frame 25 and supported in bearings 70 and 71, said operating shaft also carrying a gear wheel 73. The operating shaft 72 has a lever 74 fixed on the other end thereof, said lever being connected to an operating rod 75 operatively associated with the circulating driving of the wire length grippers 7, so as to rotate the operating shaft through a fixed angle. Further, the arm 69b is fixed on the front end of a stub shaft 76 which is parallel to said operating shaft 72 and supported in the bearing 70 and which also carries a gear wheel 77 meshing with said gear wheel 73. Therefore, actuation of the operating rod 75 entails the pivotal movement of the lever 74 to effect the opening and closing of the arms 69a and 69b.

Designated by 78 is a terminal-supply reel attached to each of the first and second terminal-crimping means 41 and 42 and designed so that terminals 43 linked together are delivered one by one onto a crimping bed in timed relation to the wire length transfer means 6 by paying-out means installed in each of the first and second terminal-crimping means 41 and 42.

The operation of the present machine will now be described.

On the side of the wire stripper 1, the clamp means 4 is moved to the left and clamps the wires 5 on the left-hand side of the cutter assembly 3. Subsequently, the clamp 4 is moved to the right through a predetermined stroke to withdraw the wires from the reels 2 while passing centrally of the cutter assembly 3 which is now in its open position. On the side of the wire length transfer means 6 which is stopped at a predetermined position, the solenoid 54 is energized, whereby the wire length gripper closing lever 53 is swung to close the wire length gripper 7 while urging the latter toward the fixed guide 57, whereupon the withdrawn wires 5 are gripped by the front and rear jaws 19 and 20 at a predetermined position close to the cutter assembly 3. At the same time, the clamp means 4 is opened to release the wires 5. The cutter assembly is closed, whereby the withdrawn wires are cut and at the same time the insulators are cut at predetermined positions on both sides of the wire cut. The cylinder 12 is then actuated to turn the wire length transfer means 6 to the right, whereupon since the cutter assembly 3 remains closed, the left-hand side cut insulators of the cut wire lengths 32 are squeezed by the insulator cutter blades and remain within the cutter assembly 3. As a result, the left-hand side ends of the cut wire lengths 32 have the insulators stripped therefrom (the insulators on the right-hand side ends of the cut wire lengths 32 have already been stripped, as will be later described), the distance L1 from the wire length gripper 7 to the rear ends of the cut wire lengths 32 being maintained constant.

In such condition, rotation of the sprocket wheel 14 moves the endless chain 13 through a distance of 1 pitch to bring the cut wire lengths 32 to the next position on the wire length transfer means 6. At the same time and on the side of the wire stripper 1, the clamp means 4 which is now open is moved to the left over the cutter assembly 3 which is now closed until it reaches the left-hand side of the cutter assembly 3, where it is stopped and becomes closed to clamp the withdrawn wires 5, and it is then slightly moved to the left to effect the stripping of the right-hand side insulators of the wires 5. The cutter assembly 3 is then opened and the clamp means 4 is moved to the right to effect the wire withdrawal. During this operation, the cylinder 12 is actuated to bring the wire length transfer means 6 back to its original position (at which if a suitable stop is provided, the stop position would be more accurately determined) and a fresh wire length gripper 7 is ready for the next wire length gripping operation.

Following the rightward movement and stoppage of the clamp means 4, the solenoid 54 is energized again, whereupon the wire lengths are gripped by the wire length gripper 7, and at the same time the clamp means 4 releases said wire lengths. By repeating the operations described above, the wires are cut into successive predetermined lengths and such wire lengths 32 having insulators stripped from both ends thereof are transferred by the transfer means 6 toward the terminal-crimping means 41 and 42 for the next process through a distance of 1 pitch each time.

When the wire length gripper 7 with the cut wire lengths 32 gripped thereby approaches the terminal-crimping means 41 or 42, it is guided between the fixed guide 39 and the movable guide 40 having a buffer embodied by the compression springs 47, so that the distance L2 to a crimp terminal 43 set in position on the terminal-crimping means 41 or 42 is maintained constant. Moreover, the bottoms of the support plates 17 and 18 of the wire length gripper 7 are guided by the guide plate 26, so that sagging of the upper run of the endless chain 13 is prevented.

When the wire lengths 32 being transferred approach the first terminal-crimping means 41, the upper and lower wire lengths 32 are guided by the upper and lower guides 59 and 60, respectively, while sliding on the upper surfaces of the guides. At the terminal ends of the guides, the upper wire length is arrested and turned back by the bend 59a, whereas the lower wire length, while being controlled as to its level or vertical position by the presser spring 61, continues to travel until it stops in front of the first terminal-crimping means 41 when the transfer means 6 is brought to a stop.

In connection with the stoppage of the transfer means 6, the operating rod 75 is actuated, whereupon the wire length holding clamp 69 is closed to clamp the lower wire length 32. As a result, said wire length 32 is subjected to position control in the direction of travel so that it is held coaxial with the first terminal-crimping means 41. When this operation is carried out, the wire length transfer means 6 has already returned to its original position. Subsequently, terminal-crimping is carried out by the operation of the first terminal-crimping means 41.

Upon completion of the terminal-crimping, the operating rod 75 is actuated in the opening direction, whereby the wire length holding clamp 69 is opened and at the same time the wire length gripper 7 is moved through a distance of 1 pitch, with the upper wire length 32 clearing the bend 59a to resume its substantially straight form.

The wire lengths 32, only the lower one of which has a crimp terminal crimped thereon, are transferred via the second wire length guide means 63 to the second terminal-crimping means 42. In this case, the lower wire length 32 is arrested and turned back by miniroller 68, wheras the upper wire length 32, while being controlled as to its level or vertical position by the presser spring 66, passes through the guide section and is then subjected to terminal-crimping operation by the second terminal-crimping means 42 while being held by the wire length holding clamp 69 which controls its position in the direction of travel in the same manner as in said first terminal-crimping means 41.

Upon completion of the terminal-crimping operation, the wire length holding clamp 69 is opened in the same manner as described above, with the lower wire length 32 passing through this region without any difficulty by virtue of the presence of the miniroller 68.

When the wire length gripper 7 gripping the upper and lower wire lengths 32 each having a terminal crimped thereon reaches the terminal end of the wire length transfer means 6, the inner side of the push portion 34 of the rear jaw 20 collides with the opener pin 51, so that the front and rear jaws 19 and 20 are urged in the opening direction against the force of the compression springs 23 until each pin 36 goes across the line connecting the stepped pin 21 or 22 and the pin 28, whereby the front and rear jaws 19 and 20 are maintained in its open position under the force of the compression springs 23. With the wire length gripper 7 thus opened, the terminal-crimped wire lengths 32 are released to fall downwardly onto the receiver pan 52.

By repetition of the various operations described above, the wires 5 withdrawn from the wire supply reels 2 are cut into successive pairs of predetermined lengths and the lengths of each pair are stripped of their insulators from both ends thereof and subjected to terminal-crimping operation on only one of their respective ends while being transferred to the receiver pan 52. Moreover, all these operations are continuously and automatically carried out.

As has so far been described in detail, according to the present invention, since the stripping of insulators on the crimp-terminal side is carried out in such a manner that after the wire lengths are gripped at a fixed position relative to the cutter assembly by wire length grippers provided on wire length transfer means for transfer to terminal-coupling means, the transfer means itself is swung, it follows that the distance L1 from the front ends of the wire lengths to the gripped position is always constant. After the wire lengths are transferred with this gripped condition maintained, the transfer means is brought back to its original position, and in front of the terminal-crimping means the guide means ensures that the distance L2 from a crimp terminal on the terminal-crimping means to the wire length gripper is constant. Further, of the wire lengths gripped by the gripper and being transferred, one which will not now be subjected to terminal-crimping operation is temporarily arrested and turned back by the wire length guide means located on the upstream side of the terminal-crimping means so as to minimize permanent deformation of such wire length and facilitate its subsequent passage, while the other which will now be subjected to terminal-crimping operation is controlled as to its level or vertical position and is then clamped by the wire length holding clamp located at the terminal end of the wire length guide means so as to effect the travel-direction position control and holding of such wire length. As a result, the relative position between the front end of the wire length and the terminal attached thereto is always constant. Thus, an accurate continuous terminal-crimping operation can be easily achieved.

Although this invention has been described and illustrated in detail, it is to be clearly understood that the same is by way of illustration and example only and is not to be taken by way of limitation, the spirit and scope of this invention being limited only by the terms of the appended claims.

We claim:

1. An apparatus for cutting an insulated electric wire into lengths and processing the ends of the resulting wire lengths comprising means for intermittently supplying said insulated electric wires through a predetermined distance in the direction of the axis of the wire, wire cutting means for cutting said supplied wire at a predetermined position during interruption of supplying operation of said wire supplying means to provide said wire length of a predetermined length, insulator cutting means for cutting substantially only the insulator of said cut wire length at a position spaced forwardly of the cutting position of said wire cutting means during interruption of supplying operation of said wire cutting means, wire length transfer means for intermittently transferring transversely of said wire supplying means the successive wire lengths in association with the intermittent supply of the wire, said transfer means including a plurality of gripping means disposed at predetermined intervals for gripping said wire lengths, one of said gripping means gripping the wire length during the interruption of the supplying operation of said wire supplying means, said transfer means having one end arranged close to said wire cutting means and insulator cutting means, at least said one of said transfer means being movable between a normal position and a shifted position spaced forwardly of said normal position, the end of said transfer means opposite said one end being remote from said wire cutting means and insulator cutting means, and shifting means for shifting said transfer means between said normal and shifted position, said shifting means being adapted to shift said transfer means forwardly from said normal position to said shifted position after one of said gripping means grips the wire length during the interruption of supplying operation of said wire supplying means, whereby the insulator portion disposed rearwardly of said insulator cutting means is stripped from said wire length, thereafter said one interval transferring of said wire length transfer means being started, said wire length transfer means being returned to said normal position such that the subsequent gripping means grips the subsequently supplied wire length.

2. An apparatus as set forth in claim 1, wherein said shifting means comprises means for positioning said gripping means at predetermined distances from said two cutting means when said transfer means is returned to said normal position, thereby ensuring that the distances from the gripping position of the gripping means to the end of the wire length gripped thereby and to the stripped position thereof are constant.

3. An apparatus as set forth in claim 1, wherein said transfer means executes transfer motion of said one interval of said gripping means while it is moved with respect to its shifted position.

4. An apparatus as set forth in claim 1, wherein said transfer means includes conveyor means of a circulating type on which said gripping means are mounted at said predetermined intervals.

5. An apparatus as set forth in claim 1, wherein said transfer means includes means for controlling the opening and closing of said gripping means.

6. An apparatus as set forth in claim 5, wherein said control means is adapted to close the gripping means during the interruption of supplying operation of said wire supplying means when said gripping means is brought to said one end of said transfer means close to said two cutting mekans and to open said gripping means when said closed gripping means is brought to the end of said transfer means remote from said two cutting means.

7. An apparatus as set forth in claim 1, wherein the alternating shifting motion of said transfer means is an alternating pivotal movement around the axis of a pivot provided on the side of said transfer means which is remote from said two cutting means.

8. An apparatus as set forth in claim 1, which further comprises means disposed relative to the path of travel of said gripping means for processing the stripped ends of said wire lengths.

9. An apparatus as set forth in claim 8, wherein said processing means is disposed relative to the position at which the gripping means is stopped as a result of the interruption of intermittent operation of said transfer means.

10. An apparatus as set forth in claim 9, which further comprises means for controlling the distance between said processing means and said gripping means, whereby the position at which the stripped end of the wire length is processed is set at a predetermined position.

11. An apparatus as set forth in claim 8, wherein said processing means includes means for applying an electric terminal to the stripped end of the wire length.

12. An apparatus as set forth in claim 8, which further comprises means for holding toward said processing means the end of the wire length brought to the position of the processing means for facility of the processing thereof.

13. An apparatus as set forth in claim 8, wherein said wire supplying means is adapted to supply a plurality of electric wire lengths.

14. An apparatus as set forth in claim 13, which further comprises means for selectively guiding only one of said plurality of wire lengths to the position of the processing means.

15. An apparatus as set forth in claim 14, wherein a plurality of processing means each corresponding to one of the plurality of wire lengths are disposed at intervals along the transfer path of said transfer means.

* * * * *

UNITED STATES PATENT OFFICE
CERTIFICATE OF CORRECTION

Patent No. 3,964,142           Dated June 22, 1976

Inventor(s) Akira Ogawa et al

It is certified that error appears in the above-identified patent and that said Letters Patent are hereby corrected as shown below:

Claim 1, column 9, line 8 replace "cutting"
                                 by --supplying-- column 9, line 18 after "one" insert
                          --end--

Claim 6, column 10, line 9 change "mekans" to
                                --means--

Signed and Sealed this

Seventh Day of September 1976

[SEAL]

Attest:

RUTH C. MASON
*Attesting Officer*

C. MARSHALL DANN
*Commissioner of Patents and Trademarks*